2,775,748

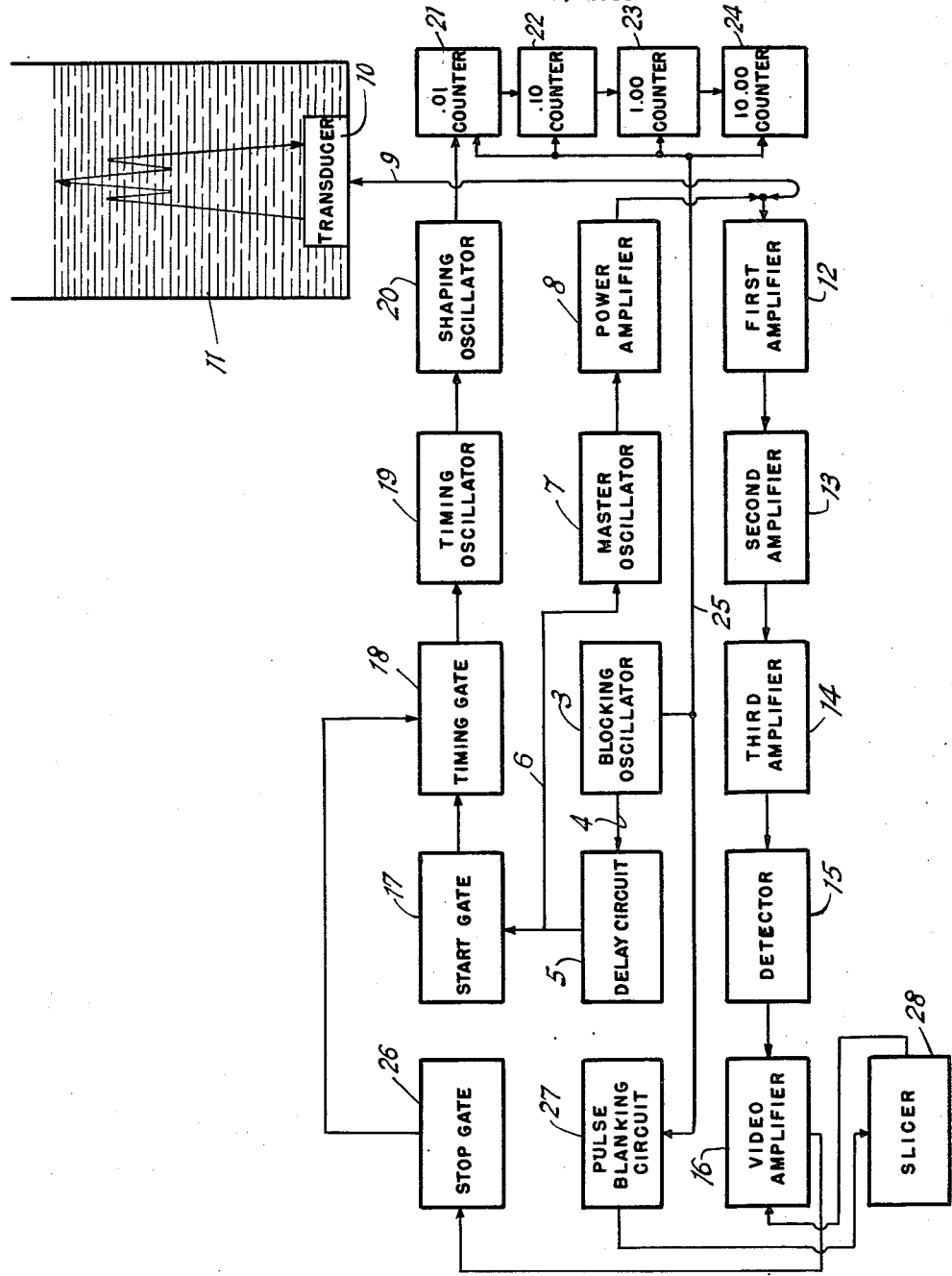
Dec. 25, 1956  R. L. ROD ET AL  2,775,748
APPARATUS FOR MEASURING LIQUID LEVELS
Filed March 17, 1953
INVENTOR
*Robert L. Rod*
BY *William D. Becher*
ATTORNEY United States Patent Office 2,775,748
Patented Dec. 25, 1956

APPARATUS FOR MEASURING LIQUID LEVELS

Robert L. Rod, New York, N. Y., and William D. Becher, Paterson, N. J., assignors to Bogue Electric Manufacturing Co., Paterson, N. J., a corporation of New Jersey Application March 17, 1953, Serial No. 342,954

11 Claims. (Cl. 340—3)

This invention relates to means for measuring the level of liquids.

The measurement of liquid levels in tanks or other containers has presented a number of problems which have been solved in part or not at all. With containers having a substantial floor area, the accuracy of level measurement by procedures heretofore known in the art is of a rather low order and accordingly introduces a substantial error in volumetric calculations.

Known systems of measuring liquid levels have in some instances required important modifications of the container construction, the use of floats or other moving parts and accessory equipment. Other systems require special data transmitting devices such as potentiometers or synchros. Many known systems are unsafe for use with explosive or inflammable liquids.

An object of this invention is to avoid the above mentioned limitations of known systems and to provide improved means for making safe, highly accurate, substantially instantaneous and automatic measurements of liquid levels, which avoids the introduction of direct current into the container and uses alternating current of such extremely small values as to make the system entirely safe for highly inflammable or explosive liquids.

Another object of this invention is to provide means for making accurate measurements with such rapidity as to give correct indication of a liquid level even when the same is constantly changing as by rising or falling.

A further object of this invention is to provide substantially instantaneous readings of a liquid level or levels or a recording of such levels, at one or more stations which may be at or remote from such liquid levels.

Yet another object of this invention is to provide means for measuring the levels of highly combustible or radioactive liquids within a closed container without the need for opening such container and with complete safety.

Still another object of this invention is to provide improved means for determining with high accuracy the location of the interface between stratified immiscible liquids or between a liquid and the vapor overlying the same.

The instant invention is based on the fact that a short train of sonic impulses may be transmitted through a liquid and will be reflected from the interface existing between the liquid surface and the air or vapor bounding said surface to a receiving device. This will also occur in the case of the interface between stratified immiscible liquids. The elapsed time between the transmission and reception of the train or pulse of sonic waves and the known velocity of the waves in the liquid medium give the distance traveled by the waves, and thus determines the liquid level with respect to the sonic wave transmitting and receiving means which may take the form of a transducer.

According to one embodiment of the invention, a sonic transducer is placed at the bottom of the liquid container. The transducer, which may be of the piezoelectric or magnetostrictive type, may be completely isolated from the liquid contents of the container by means of a suitable housing fitted with an acoustically transparent panel such as a rubber window or diaphragm. The transducer is supplied with electrical waves of a supersonic frequency. The waves occur in short pulses which may be about 40 microseconds long and the pulses may recur at any suitable frequency, such as several pulses per second.

The echo waves received by the transducer are converted thereby to electrical waves which are sent over wires to an electronic receiver. At the output of the receiver the pulses are impressed on a time measuring circuit on which the transmitted pulse is also impressed. The time interval between the transmitted pulse and its received echo may therefore be measured.

The time measuring means may consist of a system of decade counters which are reset to zero before each transmitted pulse. The transmitted pulse starts or gates a timing wave having a frequency such that the period of one cycle of the timing wave is equal to the time required for the sonic wave to traverse say .01 foot of the liquid. The timing waves are impressed on the decade counters and the number of cycles counted between the transmitted pulse and the received pulse directly indicates the height of the liquid. The output of the counters may be recorded or the count may be indicated by neon lights operated by the counting tubes of the decade counter in a manner known in the art. The system of decade counters thus provides a direct and precise decimal indication of the height of the liquid level. If desired, the system of counters or other indicators may be calibrated to directly read the volume of liquid in the tank or container.

Counters of the type described above for counting a variable number of cycles are known as non-predetermined counters; in contrast to a predetermined counter which includes means for adjustably pre-setting the counter so that it will produce an output pulse after a predetermined count.

The figure of the drawing shows a block diagram of the interconnected components comprising one embodiment of the invention.

In referring to the drawing, the various components of the system are shown by a block diagram since the components are well known to those skilled in the art. The system is controlled by a pulse generator of any suitable type, such as blocking oscillator 3. Oscillator 3 is adjusted to produce a sequence of short duration pulses. The pulses may have a duration of about 10 microseconds and a frequency of about 1 per second. The output of oscillator 3 is supplied by connection 4 to a delay circuit 5, as well as to a decade counter system and a pulse blanking circuit to be described later. The delay circuit 5 may be a delay multivibrator having a suitable time delay of about 200 microseconds.

The output of delay circuit 5 is supplied over line 6 to a master oscillator 7. The frequency of oscillator 7 may be about 400 kc. and is adapted to be pulsed into oscillation by the pulse impressed thereon by delay circuit 5. While various types of pulsed oscillators are known, it is preferred to use a ringing circuit connected to an amplifier. The ringing circuit, known in the radar art, is a parallel resonant circuit adapted to be set into oscillation by an impressed pulse. The output of master oscillator 7 is supplied through a power amplifier 8 and then over a transmission line 9 to transducer 10. Thus, the short train of oscillations, commonly called a pulse, from master oscillator 7 is amplified and when impressed on transducer 10 sets the same into mechanical vibration.

Transducer 10 which may be of the piezoelectric type with a Rochelle salt crystal element enclosed in a suitable housing which has a wall portion transparent to sonic waves, is located at the bottom of liquid container 11. It is understood that the transducer may be located in other suitable positions and pointed at the liquid level or interface either directly or in conjunction with suitable acoustical reflectors. As an alternative, the transducer may take the form of a magnetostrictive type.

Since the transducer is enclosed in a housing and since the energy level in a typical system is of the order of $1 \times 10^{-4}$ peak joules or $3 \times 10^{-6}$ average joules, it may be immersed in even the most inflammable liquids without any danger of ignition and explosion.

The sonic waves generated by transducer 10 travel through the liquid and are reflected back to the transducer from the liquid-vapor interface. The reflected sonic waves produce mechanical vibrations of the crystal and resultant electrical oscillations. These oscillations are conveyed by the common transmitting-receiving line 9 to a receiver including a plurality of amplifiers 12, 13 and 14. The oscillations are thus amplified to a suitable level and impressed on a detector 15 which rectifies and integrates the input signal and produces a video pulse. The video pulse is amplified by video amplifier 16.

The pulses from delay circuit 5 are also supplied to a start gate 17 which may be a pulse amplifier. The pulse output of gate 17 triggers a timing gate 18. The latter may be a multivibrator adapted to bias a timing wave oscillator 19 to its oscillating condition.

A shaping circuit 20 may be used to couple oscillator 19 to a decade counter system having as many decades indicated at 21, 22, 23, 24, as there are digits in the reading to be taken. It has been found that accuracy of the reading to two decimal places is obtainable. Shaping circuit 20 converts alternate half cycles of the timing wave into sharp pulses which can be counted more reliably than a sinusoidal wave, by most decade counters. Shaping circuit 20 may be omitted when not needed.

Decade counter system 21—24 may be an electronic counter provided with means for resetting it to a zero count in response to an input pulse supplied by connection 25 between the counter system and blocking oscillator 3. Such counters are known in the art and are generally provided with neon lamps which indicate the count.

The output of video amplifier 16 is supplied to a stop gate 26, which in turn is connected to timing gate 18. Stop gate 26 may be a pulse amplifier adapted to trigger timing gate 18 to its off position in order to stop timing oscillator 19 in response to a received pulse. It is necessary to enable the receiver to respond only to a received pulse, and not to a transmitted pulse, although the receiver's input is connected directly to power amplifier 8. For this purpose, blocking oscillator 3 supplies an undelayed pulse to pulse blanking circuit 27. The output of circuit 27 is fed through a slicer or limiter 28 to video amplifier 16 in order to block the latter during at least the period of the transmitted pulse.

The operation of the system should be apparent from the foregoing description. Blocking oscillator 3 sends undelayed pulses to blank video amplifier 16 of the receiver during the subsequent transmission interval and to reset the counter to zero. A predetermined time after this is done delay circuit 5 causes oscillator 7 to transmit a pulse of high frequency oscillation to transducer 10. The transducer then sends a sonic wave through the liquid and receives an echo from an interface surface of the liquid. In response to the echo wave transducer 10 produces oscillations which travel back over transmission line 9 to the receiver. The received pulse stops timing oscillator 19, which was started at the time of the transmitted pulse by a video pulse from delay circuit 5. Thus the timing oscillator 19 supplied pulses to the counter only during the interval between a transmitted pulse and received pulse.

The frequency of the timing wave may be adjusted so that each period represents .01 of a foot of the height of the liquid. The count shown by counter system 21—24 may therefore be read directly as the height of the liquid in the container. The neon lamp indicators of the counter system indicate and retain each count from the time the count is completed until the counter is reset, which is all but a very small fraction of the interval between transmitted pulses. Hence, due to visual persistence, the indication of the count appears as being continuous.

While decade counter system 21—24 has been described as including neon lamps as indicators, since this is a commercially available type of counter, it is to be understood that other types of known indicators may be used, such as pulse-integrating meters or cathode-ray tube indicators. Also suitable recorders may be connected to each decade of the counter system to give a permanent record of the count. It will also be understood that instead of one counter system, a number of such systems at different desired locations may be connected in parallel to the timing oscillator in order to give level readings at each of said locations.

The system shown and described may be used in either closed or open tanks or containers, and further, may be used to make measurements in open bodies of water such as reservoirs, rivers and the like.

Since various changes might be made in the embodiment of the invention shown and described, without departing from the spirit thereof, it is understood that all matter herein set forth or shown is to be interpreted in an illustrative and not in a limiting sense, except as indicated in the claims following.

Having thus described our invention, we claim as new and desire to protect by Letters Patent:

1. Apparatus for measuring the level of a body of liquid comprising a supersonic frequency transducer located within said body of liquid, transmitting means for impressing a pulse of electrical oscillations of said supersonic frequency on said transducer, a receiver connected to said transducer including means for receiving a pulse of electrical oscillations from said transducer, and means for measuring a variable elapsed time interval between the transmitted and received pulses including a non-predetermined electronic counter means for counting the variable number of cycles of a timing wave which occur during said variable time interval.

2. Apparatus according to claim 1 including a pulse generator for impressing pulses on said transmitting means recurrently and indicating means for giving substantially continuous indications of the measured time intervals.

3. Apparatus according to claim 2 wherein the indicating means displays each measurement of an elapsed time interval during the major portion of the time between two successive pulses from said pulse generator.

4. Apparatus for measuring the level of a body of liquid comprising a supersonic frequency transducer located within said body of liquid, transmitting means for impressing regularly recurrent pulses of electrical oscillations on said transducer, a receiver connected to said transducer, electronic decade pulse counter means connected to the transmitting means and the output of the receiver for counting a non-predetermined number of regularly spaced pulses corresponding to the length of the interval between the transmission of a pulse and its reception, and means for resetting said counter to a fixed value at a predetermined time before each pulse is transmitted by said transmitting means.

5. Apparatus according to claim 4 including a timing wave oscillator, a pulse shaping circuit connected between said oscillator and the counter, means for starting the timing wave oscillator at the time a pulse is transmitted by the transmitting means, and means for stopping the timing wave oscillator in response to a received impulse.

6. Apparatus according to claim 5 wherein said transmitting means includes a pulse generator, a delay circuit connected to said generator, a high frequency oscillator connected to said delay circuit, means connecting the output of the delay circuit to said means for starting the timing wave oscillator and means for impressing the pulses from the pulse generator on the means for resetting the counter.

7. Apparatus according to claim 6, including means connected to the delay circuit for blocking the receiver during the time of each transmitted pulse.

8. Apparatus for measuring the amount of liquid in a container comprising a piezoelectric transducer located at the bottom of said container, transmitting means for impressing regularly recurrent pulses of electrical oscillations on said transducer, a receiver connected to said transducer, timing means connected to said transmitting means and to the output of said receiver for measuring the interval between a transmitted pulse and a received pulse, means for resetting said timing means to zero a predetermined time before each pulse transmitted by said transmitting means, said timing means including an electronic decade counter means, means for causing the counter means to start counting at the time a pulse is transmitted, and means connected between the output of the receiver and the counter means for causing a received echo pulse in the output of the receiver to stop the counting by said counter means.

9. Apparatus for measuring the height of a liquid in a container comprising a piezoelectric crystal mounted at the bottom of the container, transmitting means for impressing regularly recurrent pulses on said crystal, a receiver connected to said crystal, an electronic cycle counter, and means for resetting said counter to zero a predetermined time before each pulse transmitted by said transmitting means, means for impressing a timing wave on the counter from the time of a transmitted pulse to the time of a received pulse and means connected between the last named means and the output of the receiver for stopping the timing wave from being impressed on the counter in response to a received echo pulse.

10. Apparatus for measuring the height of a liquid in a container comprising an electroacoustic transducer located within the container, transmitting means for impressing regularly recurrent pulses of supersonic electrical oscillations on said transducer, a receiver connected to said transducer, an electronic counter connected to said transmitting means and to the output of said receiver, means for resetting said counter to zero a predetermined time before each pulse transmitted by said transmitting means, a timing wave oscillator connected to the input of counter, and means for starting the timing wave oscillator at the time the transmitting means sends a pulse and for stopping the timing wave oscillator in response to a received pulse.

11. Apparatus for measuring the distance to a fluid interface surface comprising a piezoelectric crystal, transmitting means for impressing pulses of supersonic electrical oscillations on said crystal, a receiver connected to said crystal, a non-predetermined electronic decade counter, means connected to the output of said receiver for stopping the counting by the counter in response to the reception of an echo pulse by the receiver, said counter including means for resetting said counter to zero, a free-running pulse generator, a delay circuit connected between said generator and said transmitting means, and means for connecting said generator directly to said resetting means, and means connected to said generator for blocking said receiver during the transmission of a pulse by said transmitting means.

References Cited in the file of this patent

UNITED STATES PATENTS 2,433,385     Miller     Dec. 30, 1947
2,567,229     Morse     Sept. 11, 1951